(12) United States Patent
Yanagawa (10) Patent No.: US 10,949,140 B2
(45) Date of Patent: Mar. 16, 2021

(54) INSTALLER PACKAGE AND INFORMATION PROCESSING APPARATUS

(71) Applicant: BROTHER KOGYO KABUSHIKI KAISHA, Nagoya (JP)

(72) Inventor: Ryo Yanagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/695,452

(22) Filed: Nov. 26, 2019

(65) Prior Publication Data
US 2020/0174719 A1   Jun. 4, 2020

(30) Foreign Application Priority Data
Nov. 30, 2018 (JP) .............................. JP2018-224927

(51) Int. Cl.
*G06F 3/12* (2006.01)
(52) U.S. Cl.
CPC ............ *G06F 3/1225* (2013.01); *G06F 3/123* (2013.01); *G06F 3/1204* (2013.01); *G06F 3/1205* (2013.01); *G06F 3/1231* (2013.01)
(58) Field of Classification Search
CPC .... G06F 3/1225; G06F 3/1204; G06F 3/1205; G06F 3/1231; G06F 3/123
See application file for complete search history.

(56) References Cited

U.S. PATENT DOCUMENTS

| 7,689,725 | B2 * | 3/2010 | Nakamura | G06F 3/1285 710/8 |
| 9,170,765 | B2 * | 10/2015 | Sugiyama | G06F 3/1285 |
| 2004/0093491 | A1 * | 5/2004 | Ebata | G06F 9/4411 713/100 |
| 2006/0072140 | A1 * | 4/2006 | Mitani | G06F 3/1205 358/1.13 |
| 2009/0193365 | A1 * | 7/2009 | Sugiura | G06F 3/0482 715/840 |

(Continued)

FOREIGN PATENT DOCUMENTS

JP       2002-259085 A    9/2002

*Primary Examiner* — Gabriel I Garcia
(74) *Attorney, Agent, or Firm* — Scully, Scott, Murphy & Presser, PC (57) ABSTRACT

An installer package includes an installer program for an information processing apparatus. The information processing apparatus includes a storage storing a first driver, first driver information including model identification information, and first port information, and a controller configured to execute the installer program of the installer package including a second driver, an executable file including the installer program, and a reference table. The installer program, when executed by the controller, causes the information processing apparatus to perform: obtaining the first driver information from the storage; obtaining the first port information corresponding to the obtained first driver information from the storage; determining whether the model identification information of the obtained first driver information is included in the reference table; and based on determining that the model identification information of the obtained first driver information is included in the reference table, installing the second driver in the storage.

8 Claims, 8 Drawing Sheets

(56) References Cited

U.S. PATENT DOCUMENTS

| | | | |
|---|---|---|---|
| 2011/0176170 A1* | 7/2011 | Sugiyama | G06F 3/1285 358/1.15 |
| 2012/0254898 A1* | 10/2012 | Nakata | G06F 9/4411 719/324 |
| 2013/0014100 A1* | 1/2013 | Akiyama | G06F 11/3612 717/176 |
| 2018/0373519 A1* | 12/2018 | Kitabatake | H04L 61/103 |

* cited by examiner

INSTALLER PACKAGE AND INFORMATION PROCESSING APPARATUS

CROSS-REFERENCE TO RELATED APPLICATION

This application claims priority from Japanese Patent Application No. 2018-224927 filed on Nov. 30, 2018, the content of which is incorporated herein by reference in its entirety.

TECHNICAL FIELD

Aspects of the disclosure relate to a technique of installing a device driver for controlling an image processing device.

BACKGROUND

A known information processing apparatus is configured to control an image processing device. The information processing apparatus may install therein a device driver for controlling an image processing device. For example, a user installs a driver for a printer in the information processing apparatus by selecting a port that the printer will use to communicate with the information processing apparatus.

SUMMARY

Driver developers may offer standard drivers specific for types/models of image processing devices and special drivers specific for particular purposes. For example, special drivers for respective types/models of image processing devices may be available on a website, from which a user may download his/her desired special driver. To install the special driver in a user's information processing apparatus, the user has to find the desired special driver corresponding to the type/model of his/her image processing device from multiple special drivers on the website, and download the desired special driver via an Internet network. This may impose operational burdens on the user.

Aspects of the disclosure provide a technique of installing a device driver specific for a particular purpose with reduced operational burdens on a user.

According to aspects of the disclosure, an installer package may include an installer program for an information processing apparatus configured to communicate with an image processing device of a particular model. The information processing apparatus may comprise a storage, and a controller. The storage may store a first driver, first driver information, and first port information. The first driver may be configured to control the image processing device of the particular model. The first driver information may identify the first driver and include model identification information that identifies the particular model of the image processing device. The first port information may identify a name of a port that the image processing device uses to communicate with the information processing apparatus. The controller may be configured to execute the installer program of the installer package. The installer package may comprise a second driver for a particular function, an executable file including the installer program, and a reference table. The installer program, when executed by the controller, may cause the information processing apparatus to perform: obtaining the first driver information from the storage; obtaining the first port information corresponding to the obtained first driver information from the storage; determining whether the model identification information of the obtained first driver information is included in the reference table; and based on determining that the model identification information of the obtained first driver information is included in the reference table, installing the second driver in the storage, thereby storing the second driver, second driver information that identifies the second driver, the model identification information that identifies the particular model of the image processing device, and the first port information, in the storage in association with each other.

The technique disclosed in the specification may be implemented in a variety of forms, for example, with an information processing apparatus that installs therein a computer program, a method for installing the computer program, or a computer-readable storage media storing the computer program.

Aspects of the disclosure may reduce a burden on a user's operation to install a driver specific to a particular purpose.

DETAILED DESCRIPTION

An information processing apparatus according to aspects of the disclosure will be described with reference to the accompanying drawings.

[Electrical Configuration of Information Processing Apparatus]

Figure 1:
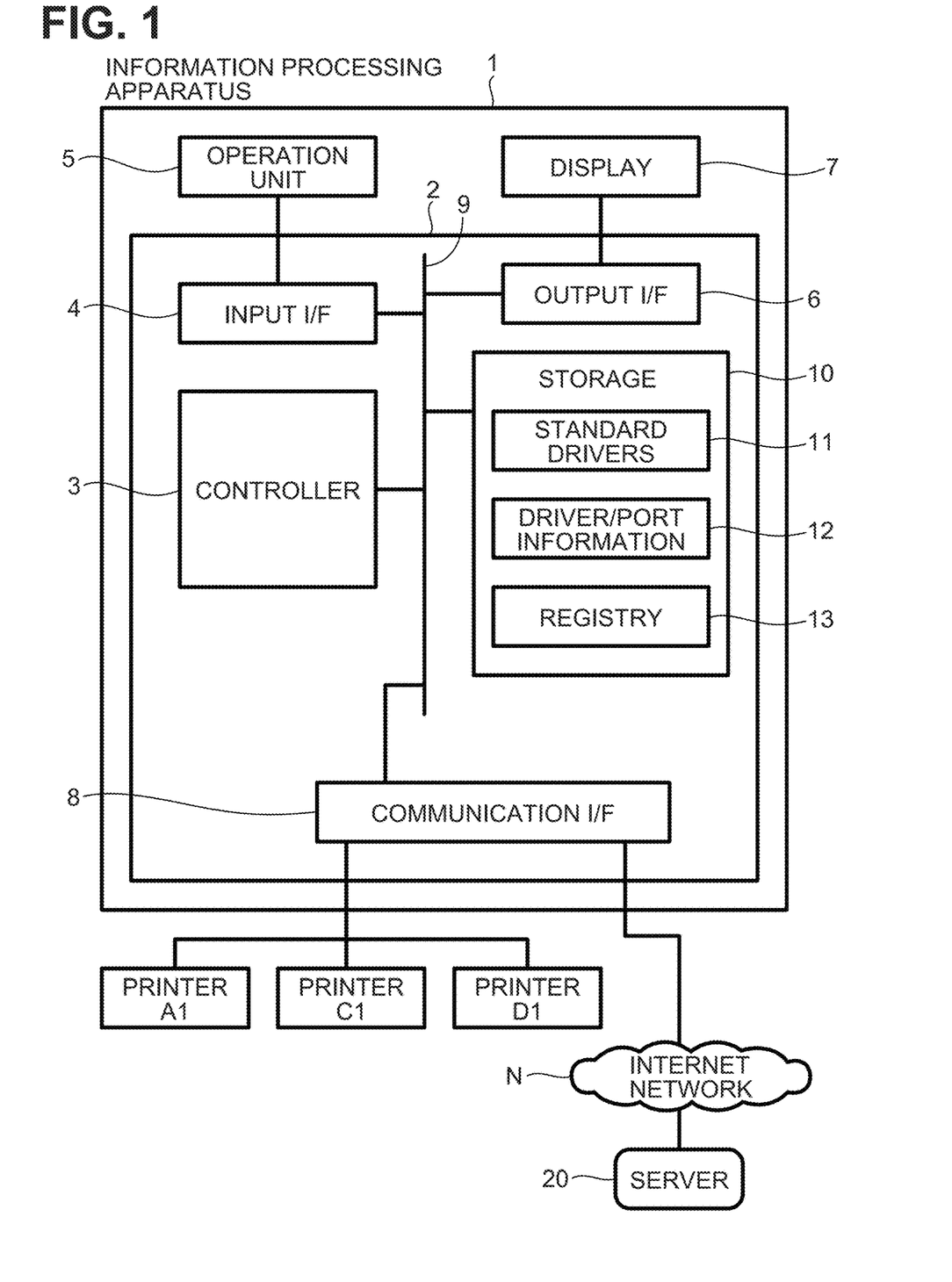
FIG. 1 is a diagram illustrating an electrical configuration of an information processing apparatus according to aspects of the disclosure.

Referring to FIG. 1, an electrical configuration of an information processing apparatus 1 will now be described.

As depicted in FIG. 1, the information processing apparatus 1 includes a main unit 2, an operating unit 5, and a display 7. The information processing apparatus 1 may be, for example, a general-purpose computer (e.g., a "PC"). The computer is not limited to a particular type/size of a computer but may be a desktop computer, a laptop computer, or a tablet computer. The information processing apparatus 1 may be a portable device/terminal. The operating unit 5 is configured to allow a user to input information thereto. The operating unit 5 includes a pointing device, e.g., a mouse and a keyboard. The operating unit 5 may include other pointing devices, such as a touch screen and a touch pad. The display 7 is configured to display information input to the operating unit 5 and a content processed by the main unit 2. The display 7 includes a display device, e.g., a liquid crystal display panel or an organic EL display panel.

The main unit 2 includes a controller 3, a storage 10, an input interface ("I/F") 4, an output I/F 6, and a communication I/F 8 that are interconnected to each other, via a bus 9. The operating unit 5 is electrically connected to the input I/F 4. The display 7 is electrically connected to the output I/F 6. The communication I/F 8 is communicatively connected to ports 1-3 to which printers are communicatively connected. In one example, a printer with its model name, e.g., "PRINTER A1", is connected to the port 1, a printer with its model name, e.g., "PRINTER C1", is connected to the port 2, and a printer with its model name, e.g., "PRINTER D1", is connected to the port 3. In the following description, the printer connected to the port 1 may be referred to as the "printer A1"; the printer connected to the port 2 may be referred to as the "printer C1", and the printer connected to the port 3 may be referred to as the "printer D1". The printers A1, C1, and D1 may be collectively referred to as a "printer" or "printers" when a common configuration of the printers A1, C1, and D1 is described. Similarly, the ports 1-3 may be collectively referred to as a "port" or "ports" when a common configuration of the ports 1-3 is described. A printer is an example of an image processing device as claimed.

The communication I/F 8 is an interface for allowing the information processing apparatus 1 to connect to a local area network ("LAN") or a wireless LAN. The communication I/F 8 has ports. Each port is a transmission control protocol/internet protocol ("TCP/IP") port and has a different IP address assigned thereto. For communication between the information processing apparatus 1 and the respective printers, a communication protocol, e.g., Bluetooth (registered trademark), may be used. In some embodiments, the communication I/F 8 may be a universal serial bus ("USB") I/F and ports may be USB ports. To use multiple communication manners/methods, the information processing apparatus 1 may include communication I/Fs and ports that correspond to the respective communication manners/methods. The communication I/F 8 has a function for allowing the information processing apparatus 1 to communicate with a server 20 via an Internet network N. The information processing apparatus 1 has a function to download, from the server 20 via the Internet network N, an installer package including, for example, a printer driver.

The controller 3 includes a central processing unit ("CPU"). The controller 3 is configured to perform overall controls of the information processing apparatus 1, as well as controls of the printers. The storage 10 includes memory, such as a read only memory ("ROM"), and a random access memory ("RAM"), a synchronous dynamic random access memory ("SDRAM"), and a hard disc drive ("HDD"). The storage 10 stores control programs to be executed by the controller 3. A set of instructions that performs a particular task may be herein referred to as a program. The storage 10 stores standard drivers 11 for the respective printers such that the standard drivers 11 can be uninstalled or updated (e.g., re-installed). A standard driver 11 is provided for a respective printer model. The standard driver 11 operates as a driver for controlling a particular printer that has a model corresponding to the standard driver 11 and that is connected to a network. The standard driver 11 has a driver name that includes a model name of a printer corresponding to or associated with the standard driver 11. The driver name of the standard driver 11 may be simply referred to as the "standard driver name" For example, the standard driver of the printer A1 has a driver name "PRINTER A1 DRIVER", which includes the model name, e.g., PRINTER A1. Similarly, the standard driver of the printer C1 has a driver name "PRINTER C1 DRIVER", and the standard driver of the printer D1 has a driver name "PRINTER D1 DRIVER". The standard drivers of the printers A1, C1, and D1 may be referred to as the printer A1 driver, the printer C1 driver, and the printer D1 driver, respectively. The controller 3 is configured to cause the printer A1 driver to control the printer A1, the printer C1 driver to control the printer C1, and the printer D1 driver to control the printer D1. The printer A1 driver, the printer C1 driver, and the printer D1 driver may be collectively referred to as a "printer driver" or "printer drivers" when a common configuration of the printer A1 driver, the printer C1 driver, and the printer D1 driver is described.

A standard driver 11 corresponds to or is associated with a particular type of printers among multiple types of printers, and is configured to control a specific printer corresponding to the particular type.

The storage 10 is configured to store driver/port information 12 in association with the standard driver 11, such that the driver/port information 12 can be readable and rewritable. The driver/port information 12 includes a driver name of a standard driver 11, and a name of a port to which a particular printer to be controlled by the standard driver 11 is connected. A name of a port may be hereinafter referred to as a "port name" The driver/port information 12 of the standard driver 11 of the printer A1 includes the driver name of the printer A1 (e.g., PRINTER A1 DRIVER) and the name of the port 1 (e.g., PORT 1) to which the printer A1 is connected. The driver/port information 12 of the standard driver 11 of the printer C1 includes the driver name of the printer C1 (e.g., PRINTER C1 DRIVER) and the name of the port 2 (e.g., PORT 2) to which the printer C1 is connected. The driver/port information 12 of the standard driver 11 of the printer D1 includes the driver name of the printer D1 (e.g., PRINTER D1 DRIVER) and the name of the port 3 (e.g., PORT 3) to which the printer D1 is connected. In the illustrative embodiment, a name of a standard driver (e.g., a standard driver name) includes a character string that identifies a type of a printer corresponding to the standard driver. In short, a standard driver name includes information that identifies a type (e.g., a model name) of a printer corresponding to a standard driver. A port name includes information that identifies a printer to be controlled by its corresponding standard driver.

The storage 10 stores driver information (e.g., first driver information) and port information. The first driver information identifies a standard driver 11 and includes model identification information that identifies a particular type/model of a printer corresponding to the standard driver 11. The port information identifies a name of a port that the printer uses to communicate with the information processing apparatus 1.

A standard driver is an example of a first driver and a third driver as claimed.

A user is allow to install a special driver into the storage 10. The special driver is a unique driver that enables a special printing that cannot be achieved by the standard driver. Examples of the special printing may include printing in a specific format or printing on a nonstandard-sized sheet. If a special driver has been installed in the storage 10, the storage 10 may store, in addition to the standard drivers 11 and their driver/port information 12, the special driver and its driver/port information that includes driver information representing a driver name of the special driver, and port information representing a name of a port that a printer to be controlled by the special driver uses to communicate with the information processing apparatus 1. The model name of the printer is stored in a registry 13 in the storage 10 in association with the special driver. In other words, the special driver and its driver/port information are stored in the storage 10 in association with each other. The driver/port information of the special driver includes driver information (e.g., second driver information) that identifies the special driver, and port information that identifies a name of a port that a printer associated with the special driver uses to communicate with the information processing apparatus 1. Model identification information that identifies the model of the printer is stored in the registry 13, as described above, in association with the special driver, the driver information (e.g., the second driver information), and the port information.

[Installation of Special Driver]

Referring to FIGS. 2-5, procedures for installing the special driver will now be described.

A special driver installer package 30 is used for installing a special driver. The installer package 30 may be common to multiple types (e.g., models) of printers. In other words, the special driver before it is installed is not associated with a particular model of a printer.

Figure 2:
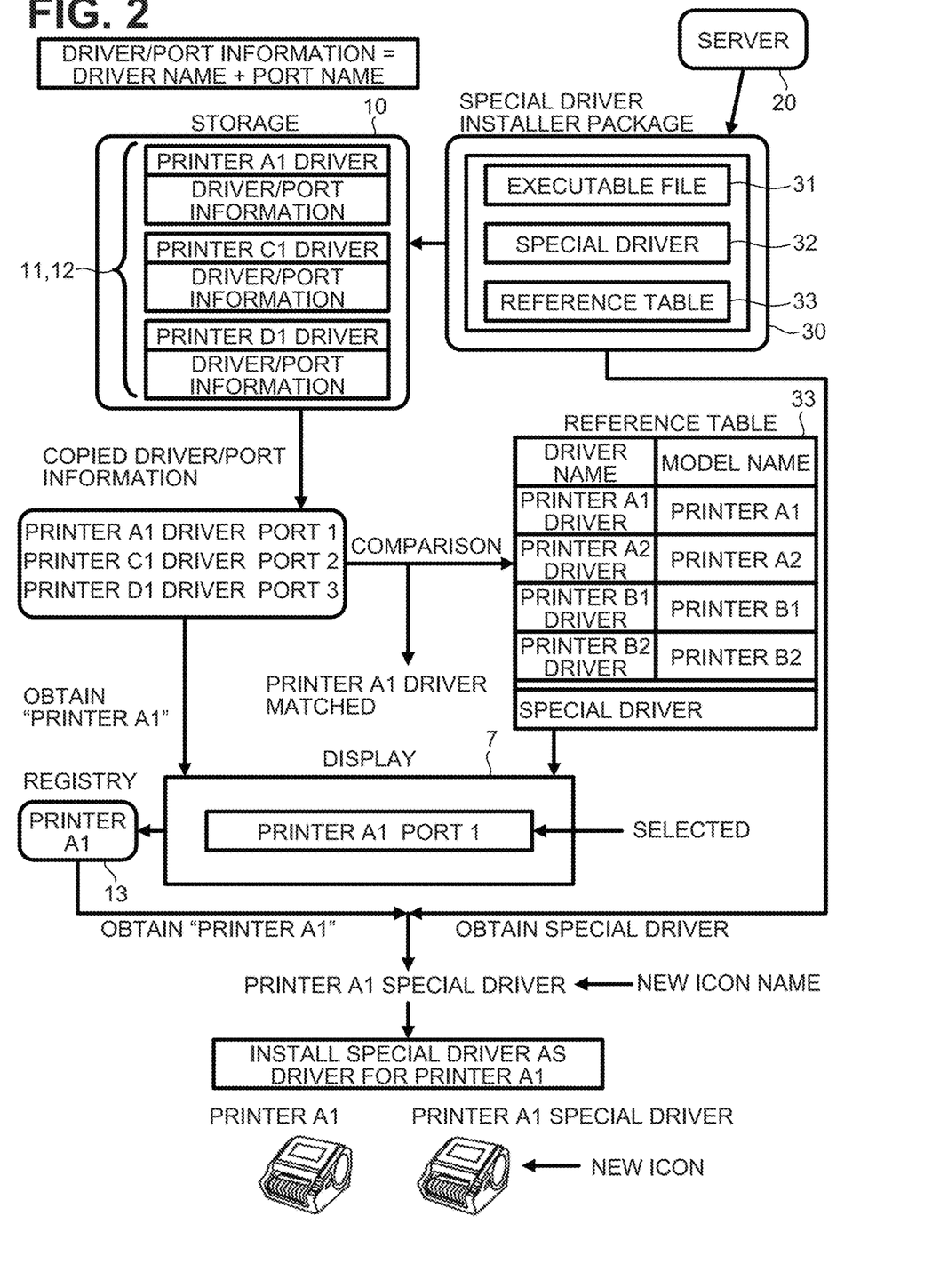
FIG. 2 is a diagram conceptually illustrating a flow of installing a special driver in the information processing apparatus of FIG. 1, according to aspects of the disclosure.

As depicted in FIG. 2, the information processing apparatus 1 may download the special driver installer package 30 from the server 20 via the Internet network N. The special driver installer package 30 includes an executable (.exe) file 31 that includes an installer program for executing installation, a special driver 32, and a reference table 33.

The reference table 33 includes installation information required for installing the special driver 32. In one example, the reference table 33 shows driver names that the controller 3 refers to, to install the special driver 32. The controller 3 may refer to the standard driver names, in the reference table 33, that are associated with model names of printers to be controlled by the respective standard drivers. In an example shown in FIG. 2, the reference table 33 includes, as installation information, the model names of the printers (e.g., PRINTER A1, PRINTER A2, PRINTER B1, and PRINTER B2) controllable by the special driver 32, and the respective standard driver names (e.g., PRINTER A1 DRIVER, PRINTER A2 DRIVER, PRINTER B1 DRIVER, and PRINTER B2 DRIVER). The reference table 33 also includes, as installation information, a name of the special driver 32 that the controller 3 refers to, to update the special driver 32. The special driver 32 is prepared commonly for multiple types/models of printers, and is not associated with a particular model of a printer before installed.

The special driver installer package 30 includes the executable file 31 for installing the special driver 32 that is common to multiple printer models, and the reference table 33 used for installing the special driver 32. The reference table 33 shows one or more standard driver names, each associated with a respective printer model among multiple models. The special driver installer package 30 is an example of an installer package as claimed. The special driver 32 is an example of a second driver as claimed.

Figure 4:
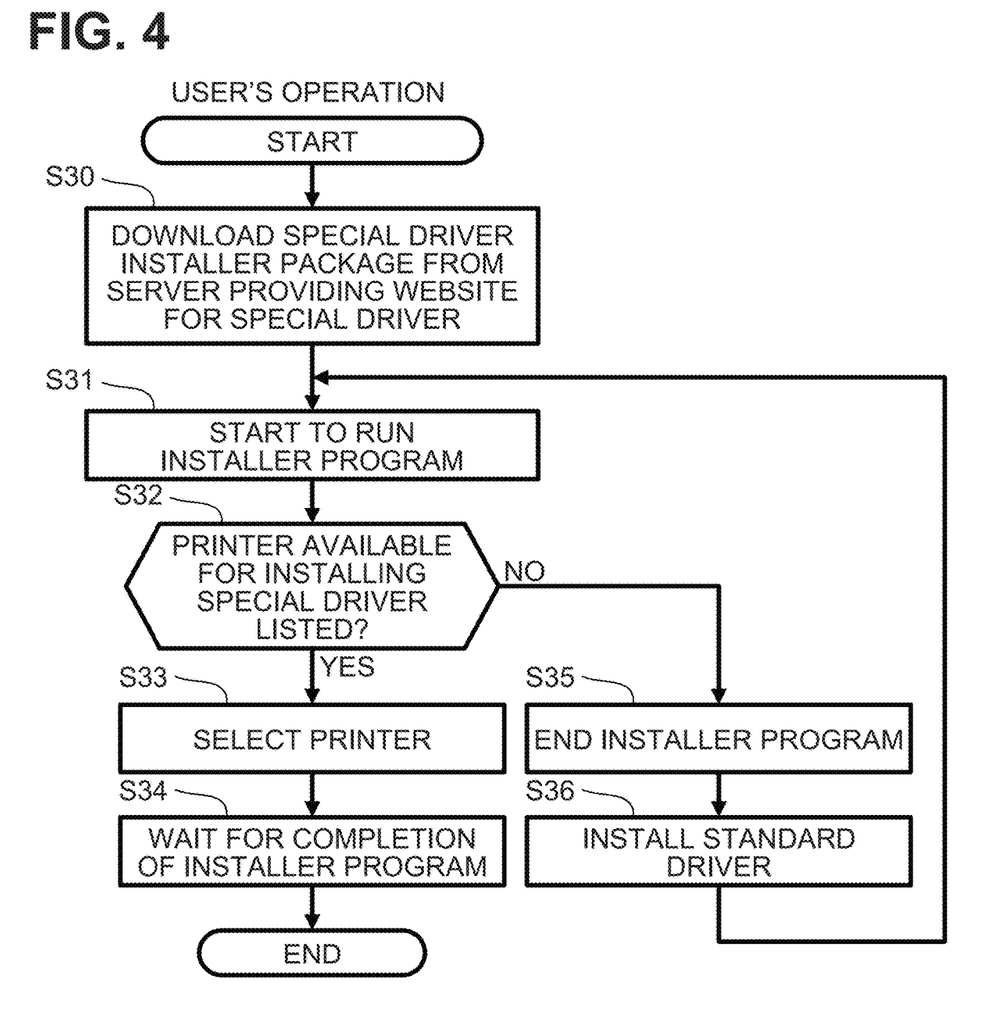
FIG. 4 is a flowchart illustrating user's operations for installing the special driver, according to aspects of the disclosure.

A user may download the special driver installer package 30 from the server 20 that provides a website for the special driver 32, via the Internet network N, into the storage 10 of the information processing apparatus 1 (at S30 in FIG. 4). Subsequently, the user starts to run an installer program stored in the storage 10 (S31). Starting the installer program may cause the executable file 31 to be executed. This may cause the display 7 (FIG. 1) to display, in a user interface ("UI"), a name of a printer available for the special driver 32 installation and a port name of the printer (refer to FIG. 5).

The following describes how the controller 3 causes the display 7 to display a name of a printer available for the special driver 32 installation and a port name of the printer. The executable file 31 includes programs for comparing driver names in driver/port information (in FIG. 1) stored in the storage 10 of the information processing apparatus 1 with driver names in the reference table 33 downloaded into the storage 10, finding a match with respect to the driver name between the driver/port information and the reference table 33, and displaying, in the display 7, a model name of a printer corresponding to the matched driver name.

As depicted in FIG. 2, the controller 3 of the information processing apparatus 1 copies pieces of the driver/port information stored in the storage 10 into a temporary location in the storage 10. Each piece of the driver/port information includes a driver name and a port name Subsequently, the controller 3 compares the driver names in the copied pieces of the driver/port information with the driver names in the reference table 33 downloaded and stored in the storage 10. In an example shown in FIG. 2, the controller 3 finds a match with respect to the driver name, e.g., PRINTER A1 DRIVER. The controller 3 reads out from the reference table 33, a model name (e.g., PRINTER A1) corresponding to the matched driver name. The controller 3 also reads out a port name (e.g., PORT 1) of the printer A1 from its driver/port information stored in the storage 10. The controller 3 causes the display 7 to display the model name and the port name of the printer A1 (e.g., PRINTER A1 and PORT 1) in association with each other. If the controller 3 finds multiple matches with respect to the driver name, the controller 3 causes the display 7 to display model names and port names corresponding to the matched driver names in association with each other. The display 7 may display a port name, e.g., an IP address for a TCP/IP port and "USB1" for a USB port. In an example shown in FIG. 5, the UI of the display 7 displays a printer name, e.g., PRINTER A1, and a port name, e.g., an IP address of a TCP/IP port, 11.22.33.44.

The user will understand that a printer available for the special driver 32 installation has been listed (S32: Yes in FIG. 4). By operating the operating unit 5, the user selects the printer that the user wishes to use for printing with the special driver 32 (S33). Based on the user's operation, the installation of the special driver 32 starts. The user waits for completion of the installer program (S34). In an example shown in FIG. 5, the user may select a set of a printer name and a port name (e.g., PRINTER A1 and 11.22.33.44) with a pointing device, e.g., a mouse, of the operating unit 5. The user then may select a "next" button to start the installation of the special driver 32.

In other words, the information processing apparatus 1 is configured to receive an instruction for designating one set of information including a model name and a port name displayed in the display 7.

Figure 5:
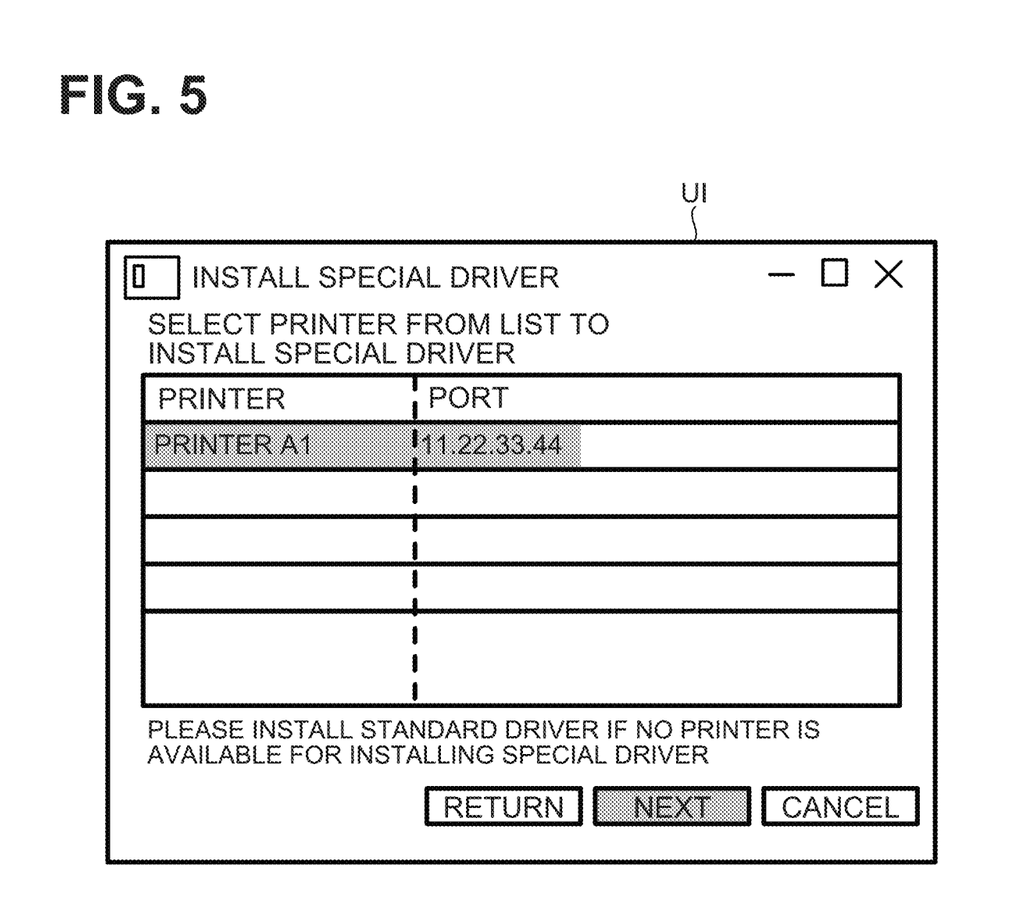
FIG. 5 is a diagram illustrating an example of a user interface displayed in a display of the information processing apparatus of FIG. 1, according to aspects of the disclosure.

If no printer is listed at S32, such a message may be displayed that indicates no printers available for the special driver 32 installation, and the user may once finish the installation. Based on user's operation of a cancel button as depicted in FIG. 5, the installer program ends (S35). Before installing the special driver, the user may install a standard driver (S36), using, for example, a CD-ROM that may be packed with his/her printer.

As described above, if the user wishes to install the special driver 32 for controlling the printer A1, the user may select a set of information (e.g., PRINTER A1 and 11.22.33.44) displayed in the display 7. This may cause the special driver 32 to be installed in the storage 10. Registration of information about printer models controllable by the special driver 32, in the reference table 33 may allow the special driver 32 to be offered as a driver common to multiple printer models. This may eliminate the necessity of preparing a website that offers multiple special drivers 32 for different printer models. In addition, the user does not have to find a special driver corresponding to his/her printer model in the website. The model name and the port name of the standard driver 11 installed in the information processing apparatus 1 is used for the installation of the special driver. This may reduce user's operation to designate a printer in the information processing apparatus 1, thereby reducing a burden on a user's operation to install the special driver 32.

Upon completion of the installation of the special driver 32, the controller 3 stores, in the registry 13, the model name (e.g., PRINTER A1) of the printer selected on the display 7. Since the registry 13 is a storage area that is not readily accessible by a user, the model name of the printer is less likely to be rewritten. The model name of the printer may be stored in a storage area other than the registry, if that storage area is not readily accessible by a user. The model name of the printer stored in the registry 13 may be used for updating the special driver 32, which will be described in detail below with reference to FIG. 3. Upon completion of the installation, an icon with a name (e.g., label or text), "PRINTER A1 SPECIAL DRIVER", is displayed in the display 7 as depicted in FIG. 2. The user may select the icon to cause the printer A1 to perform special or particular printing using the special driver 32. The icon name "PRINTER A1 SPECIAL DRIVER" is generated, based on the model name selected on the display 7 and the driver name included in the special driver installer package 30. Data for a character string representing "SPECIAL DIVER" is included in the downloaded special driver installer package 30 and stored in the storage 10. The data is used for the icon name. The user may readily identify the printer A1 special driver with its icon name (e.g., label or text).

Information on the icon name (e.g., PRINTER A1 SPECIAL DRIVER) generated based on the installation of the special driver 32 is readably stored in a particular storage area for the special driver 32 in the storage 10. The printer A1 is an example of an image processing device as claimed.

[Updating Special Driver]

Figure 3:
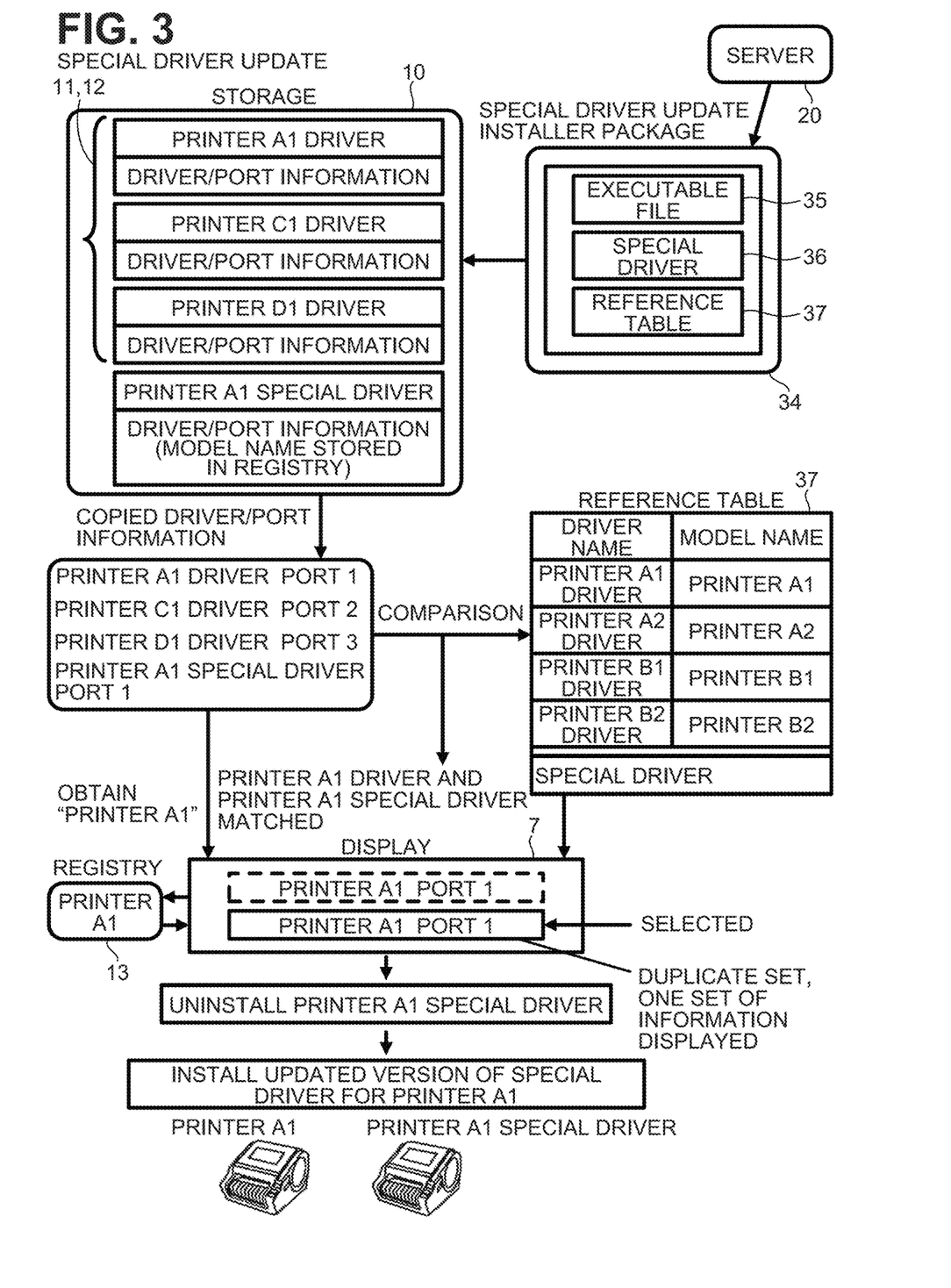
FIG. 3 is a diagram conceptually illustrating a flow of updating the special driver according to aspects of the disclosure.

Referring to FIG. 3, procedures for updating the special driver 32 will now be described. A user may perform similar operation as he/she did to install the special driver 32 for the first time. In a case where the standard driver 11 has been uninstalled at the time of installing an updated version of the special driver 32, information of an older version of the special driver 32 (e.g., the currently installed special driver 32) may be used, unless the older version is uninstalled. In one example, driver/port information of the older version of the special driver 32 and the model name stored in the registry 13 may be used. The special driver 32 may be updated when a version of the special driver 32 is changed or upgraded. In one example, the special driver 32 may be updated by uninstalling the currently installed special driver (e.g., the older version of the special driver) and installing a new updated version of the special driver, rather than by adding changes/modifications to the currently installed special driver.

As depicted in FIG. 3, the storage 10 of the image processing device 1 stores the printer A1 special driver that has been installed as a special driver 32 for controlling the printer A1, and the driver/port information of the printer A1 special driver. The driver/port information of the printer A1 special driver includes such information, e.g., a driver name (e.g., Special Driver) and a port name (e.g., PORT 1). The model name of the printer A1 is stored in the registry 13.

The special driver 32 may be updated first by downloading a special driver update installer package 34 from the server 20. The special driver update installer package 34 includes an executable (.exe) file 35 for installing an updated version of the special driver 32, an updated/new version 36 of the special driver, and a reference table 37. The reference table 37 is the same as the reference table 33 included in the special driver installer package 30 (in FIG. 2) used for installing the special driver 32 for the first time. The reference table 37 may not necessarily be the same as the reference table 33 as depicted in FIG. 2. For example, if a particular model of a printer to be controlled by the special driver is increased or added, the reference table 37 may additionally include a standard driver name corresponding to the particular model and a name of the particular model. The special driver update installer package 34 is an example of an installer package as claimed. The updated special driver 36 is an example of a second driver as claimed.

Based on a user's operation of executing the executable file 35 in the special driver update installer package 34 downloaded from the server 20 into the storage 10, the controller 3 of the information processing apparatus 1 copies pieces of the driver/port information stored in the storage 10 into a temporary location in the storage 10. Subsequently, the controller 3 compares the driver names in the copied pieces of the driver/port information with the driver names in the reference table 37 downloaded and stored in the storage 10. In an example shown in FIG. 3, the controller 3 finds two matches with respect to the driver name, e.g., PRINTER A1 DRIVER and SPECIAL DRIVER. The model names and the port names corresponding to the two matches are the same, e.g., PRINTER A1 and PORT 1. Two sets of information including PRINTER A1 and PORT 1 may thus be extracted. The two sets include the same information, so that one set may be displayed in the display 7. In the example shown in FIG. 3, one set of information representing the model name and the port name (e.g., PRINTER A1 and PORT 1) is displayed in the display 7.

Based on a user's selection of the information displayed in the display 7 (e.g., PRINTER A1 and PORT 1), the controller 3 uninstalls the older version of the special driver 32 that has been currently installed in the storage 10, and installs the updated version 36 of the special driver in the storage 10 for the printer A1. In other words, selecting information (e.g., PRINTER A1 and PORT 1) displayed in the display 7 may allow a user to update the special driver 32 to the updated special driver 36. This may reduce operational burdens on the user when updating the special driver 32.

The icon name (e.g., a label/text) "PRINTER A1 SPECIAL DRIVER" corresponding to the special driver 32 may be deleted in association with the uninstallation of the special driver 32. Based on the installation of the updated special driver 36, an icon name, e.g., "PRINTER A1 SPECIAL DRIVER" is generated and added to the icon representing the printer A1. In short, the icon name, which identifies the printer to which the special driver 32 is applied, remains the same before and after updating the special driver 32. The icon name may help the user to select the correct printer when printing using the updated special driver 36.

[Flow of Installing Special Driver]

Referring to flowcharts of FIGS. 6-8, processing to be executed by the controller 3 for installing a special driver (e.g., the special driver 32 or the updated special driver 36) will now be described.

Figure 6:
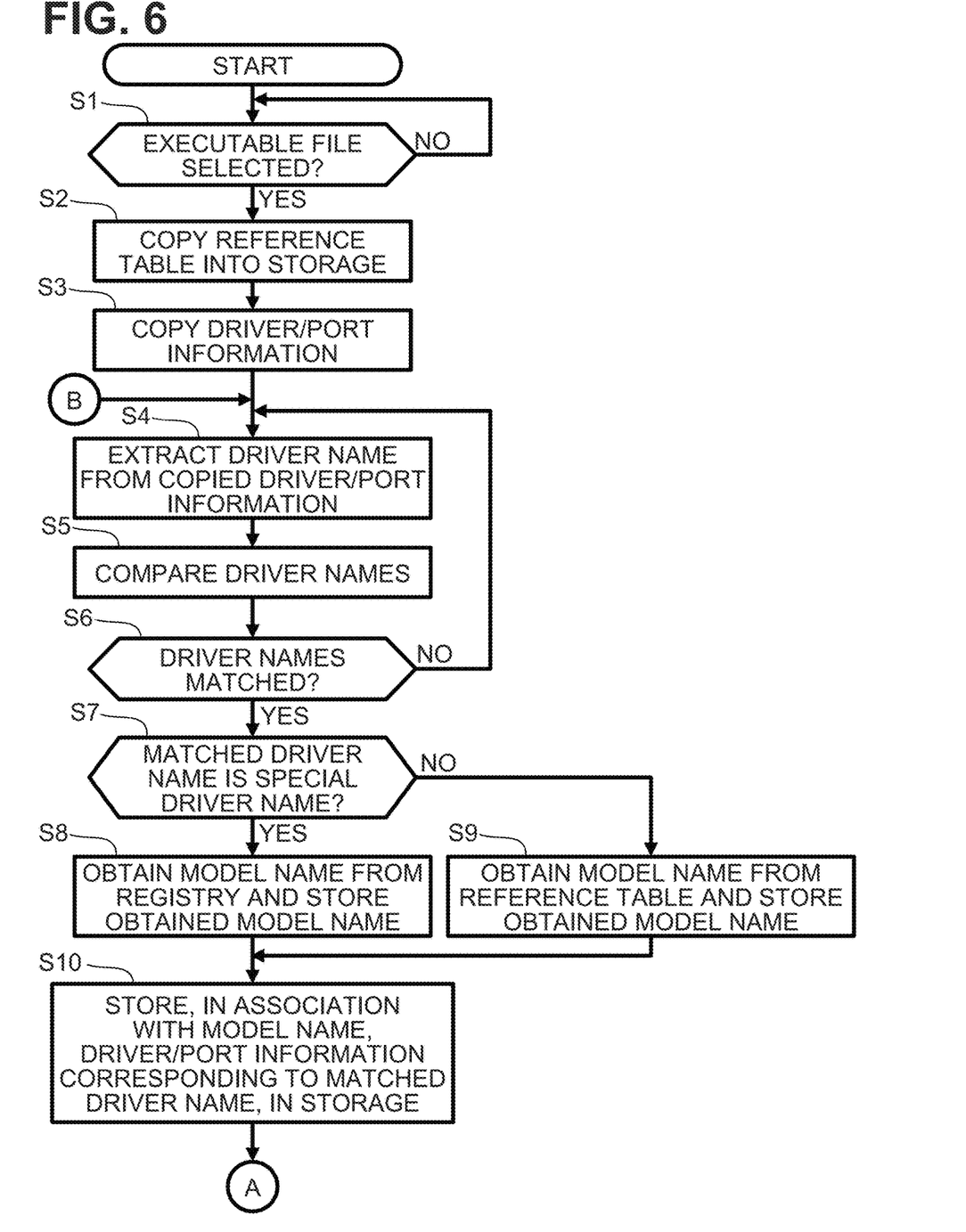
FIG. 6 is a flowchart illustrating steps to be executed by a controller of the information processing apparatus of FIG. 1 for installing the special driver, according to aspects of the disclosure.

The controller 3 determines whether the executable file 31, 35 in the installer package 30, 34 downloaded from the server 20 into the storage 10 is selected, e.g., an installation is instructed (S1 in FIG. 6). If the controller 3 determines that the executable file 31, 35 is selected (S1: Yes), the controller 3 copies the reference table 33, 37 in the installer package 30, 34 into an area of the storage 10 such that the controller 3 can refer to the reference table (S2). Subsequently, the controller 3 copies the driver/port information, which has been stored in the storage 10 before the installer package is downloaded, into a temporary location in the storage 10 (S3). The controller 3 sequentially extracts a driver name from the copied driver/port information (S4). If the special driver 32 has already been installed in the storage 10, the controller 3 obtains the driver name of the special driver 32 from the storage 10. Subsequently, the controller 3 compares the driver name extracted at S4 with driver names shown in the reference table (S5). Subsequently, the controller 3 determines whether the extracted driver name matches a driver name in the reference table (S6). If the controller 3 determines the extracted driver name matches with a driver name in the reference table (e.g., the controller 3 finds a match) (S6: Yes), the controller 3 determines whether the matched driver name is a special driver name (S7).

If the controller 3 determines that the matched driver name is not a special driver name (S7: No), the controller 3 obtains the model name corresponding to the matched driver name, from the reference table. The controller 3 stores the obtained model name in the storage 10 (S9). If the controller 3 determines that the matched driver name is a special driver name (S7: Yes), the controller 3 obtains the model name corresponding to the special driver name, from the registry 13. The controller 3 stores the obtained model name in the storage 10 (S8). In other words, when the controller 3 determines that the matched driver name is the special driver name, it means that the special driver 32 has already been installed in the storage 10. The model name designated during the course of the installation of the special driver, is stored in the registry 13, so that the controller 3 can obtain the model name from the registry 13. Subsequently, the controller 3 stores, in association with the model name, the driver/port information (e.g., a driver name and a port name) corresponding to the matched driver name, in the storage 10 (S10). For example, in a case where a matched driver name is the printer A1 driver, the controller 3 stores the driver/port information (e.g., PRINTER A1 DRIVER/PORT 1) corresponding to the matched driver name and the model name (e.g., PRINTER A1) in the storage 10 in association with each other. In a case where a matched driver name is the special driver, the controller 3 stores the driver/port information corresponding to the matched driver name (e.g., SPECIAL DRIVER/PORT 1) and the model name (e.g., PRINTER A1) in the storage 10. "SPECIAL DRIVER" is an example of second driver information as claimed.

If the controller 3 determines that the extracted driver name does not match any of the driver names in the reference table (S6: No), the controller 3 returns to S4 in which the controller 3 extracts a next driver name and compares the driver name with the respective driver names in the reference table (S5). In other words, the controller 3 repeatedly performs extraction and comparison with respect to each driver name in the copied driver/port information.

Figure 7:
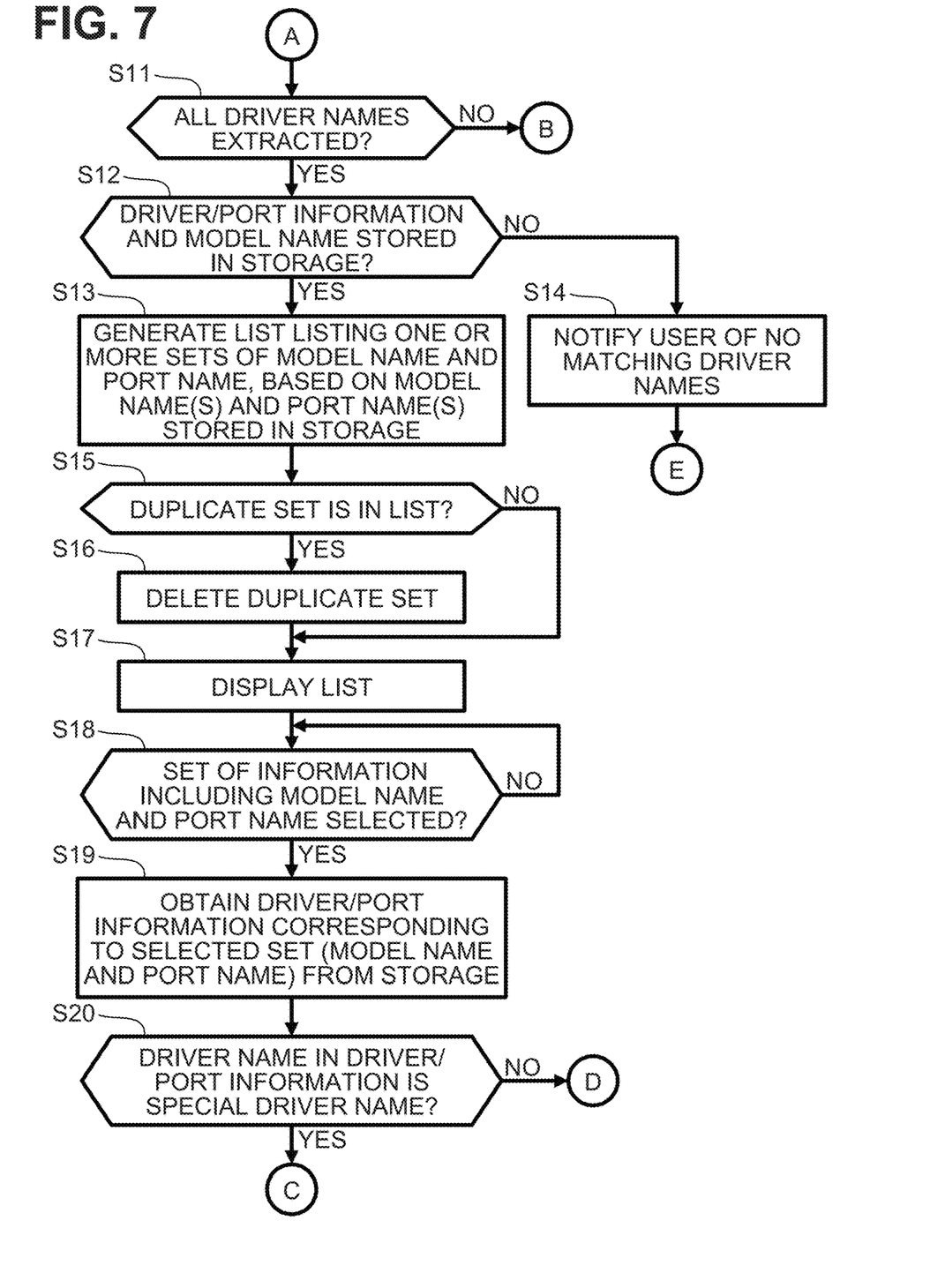
FIG. 7 is a flowchart continuing from FIG. 6.
Figure 8:
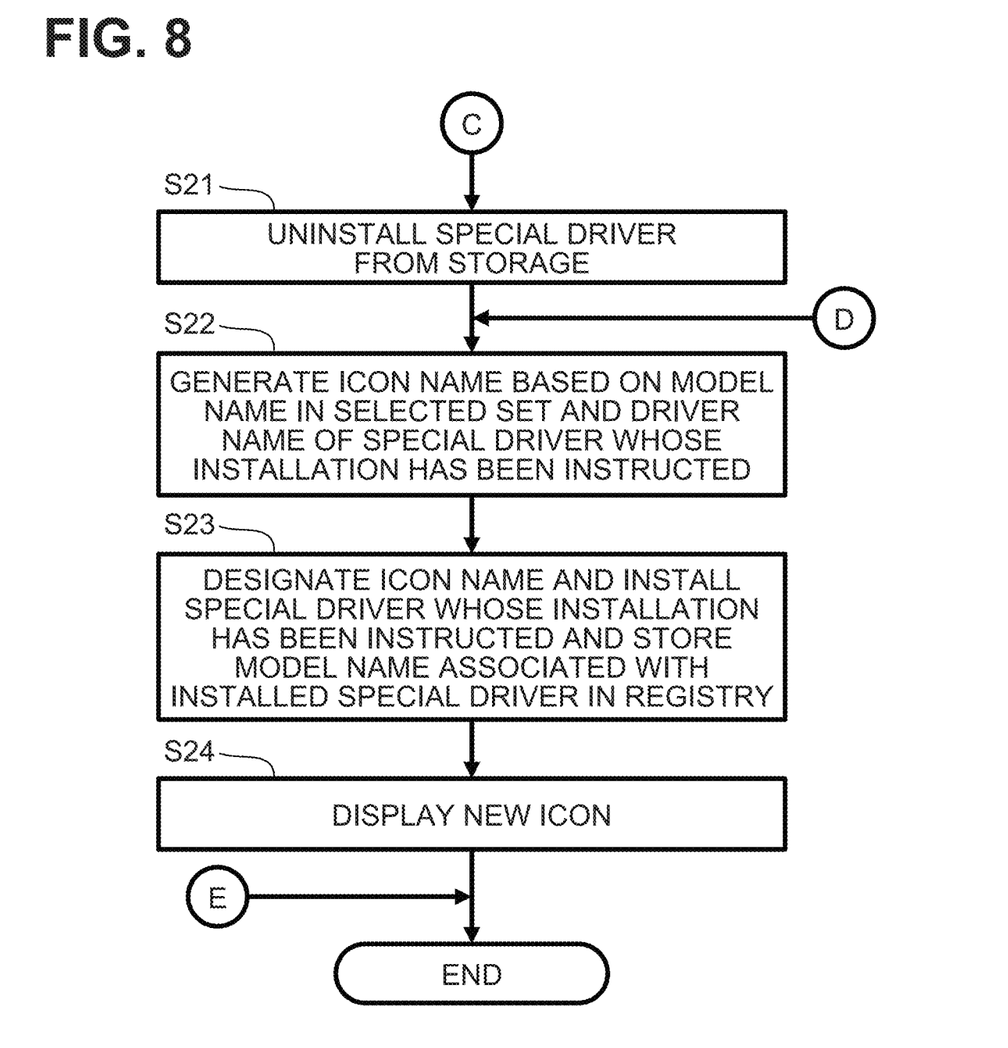
FIG. 8 is a flowchart continuing from FIG. 7.

The controller 3 determines whether all driver names are extracted from pieces of the copied driver/port information (S11 in FIG. 7). If the controller 3 determines that all driver names are extracted from pieces of the driver/port information (S11: Yes), the controller 3 determines whether the driver/port information and the model name are stored in the storage 10 (S12) as a result of the execution of steps S8-S10. If the controller 3 determines that the driver/port information and the model name are stored in the storage 10 (S12: Yes), the controller 3 generates a list listing one or more sets of a model name and a port name, based on the model name(s) and the port name(s) stored in the storage 10 (S13).

Subsequently, the controller 3 determines whether a duplicate set is in the list (S15). If the controller 3 determines that a duplicate set is in the list (S15: Yes), the controller 3 deletes the duplicate set (S16). Subsequently, the controller 3 causes the display 7 to display the generated list (S17). In other words, the controller 3 causes the display 7 to display a model name of a printer identified by the driver name obtained at S4 and determined as a matched driver name at S6, in association with a port name of the printer to be controlled by the driver whose name is determined as the matched driver name at S6. If the controller 3 has obtained, at S4, a special driver name, the controller 3 may generate a list listing a model name representing the model of a printer identified by the special driver name in association with a port name of the printer to be controlled by the special driver. If the controller 3 determines that the list includes duplicate sets of information, e.g., each of the duplicate sets includes the same model name and the same port name, the controller 3 causes the display 7 to display one set of information. In other words, the controller 3 causes the display 7 to display multiple sets of a model name and a port name when at least one of the model name and the port name is different among the multiple sets.

If the controller 3 determines that the list includes multiple sets in which no duplicate set is present, the controller 3 causes the display 7 to display a list listing one or more sets of a model name and a port name. If multiple driver names are determined to be matched at S6, the controller 3 may cause the display 7 to display a list including multiple sets of a model name and a port name.

In an example shown in FIG. 2, "PRINTER A1 DRIVER" is included in a piece of the driver/port information copied into the temporary location of the storage 10, as well as in the reference table 33. The controller 3 thus determines "PRINTER A1 DRIVER" as a matched driver (S6: Yes). If the controller 3 determines that the name of the matched driver is not a special driver name (S7: No), the controller 3 obtains the model name (e.g., PRINTER A1) from the reference table 33 and stores the obtained model name in the storage 10 (S9). Subsequently, the controller 3 stores, in the storage 10, the driver/port information corresponding to the printer A1 (e.g., PRINTER A1 DRIVER/PORT 1) (S10).

Subsequently, the controller 3 determines whether a set of information including a model name and a port name is selected by a user from the list displayed in the display 7 (S18). If the controller 3 determines that a set is selected from the list (S18: Yes), the controller 3 obtains the driver/port information corresponding to the selected set (e.g., the model name and the port name) from the storage 10 (S19). If multiple pieces of driver/port information corresponding to the selected set (e.g., the model name and the port name) are stored in the storage 10, the controller 3 obtains the multiple pieces of driver/port information. Subsequently, the controller 3 determines whether the driver name represented in the driver/port information obtained at S19 is a special driver name (S20). If the controller 3 determines that the driver name represented in the driver/port information obtained at S19 is a special driver name (S20: Yes), the controller 3 uninstalls the special driver from the storage 10 (S21 in FIG. 8). Uninstallation of the special driver from the storage 10 may cause the special driver to be updated to a new version.

Subsequently, the controller 3 generates an icon name (S22) based on the model name in the set selected from the list at S18 and the driver name of the special driver (e.g., the special driver 32 or the updated special driver 36) whose installation has been instructed. The driver name of the special driver 32 is "SPECIAL DRIVER". Data on the character string of "SPECIAL DRIVER" for the special drive 32 is stored in the special driver installer package 30 (FIG. 2). The driver name of the updated special driver 36 is also "SPECIAL DRIVER". Data on the character string of "SPECIAL DRIVER" for the updated special driver 36 is stored in the update installer package 34 (FIG. 3). In the example shown in FIG. 2, the controller 3 generates an icon name "PRINTER A1 SPECIAL DRIVER" based on an instruction to install the special driver 32 as a driver for controlling the printer A1. In the example shown in FIG. 3, the controller 3 also generates an icon name "PRINTER A1 SPECIAL DRIVER" in response to an instruction to install the updated special driver 36 as a driver for controlling the printer A1. Information on the icon name generated at S22 is stored in the storage 10.

In other words, the controller 3 stores, in the storage 10, the information on the icon name that is to be displayed in the display 7 of the information processing apparatus 1 together with an icon (at S24 described below), after the special driver 32 (or the updated special driver 36) is installed (at S23 described below). The information on the icon name includes a character string "SPECIAL DRIVER" that can identify the driver as a special driver, and a character string "PRINTER A1" that can identify the model name stored in the storage 10 in association with the special driver.

Subsequently, the controller 3 designates the icon name generated at S22 and installs the special driver (e.g., the special driver 32 or the updated special driver 36) whose installation has been instructed (S23).

In other words, the controller 3 installs the updated special driver 36 for the special driver 32 stored in the storage 10, if the port name and the model name in the set selected on the display 7 by a user using the operating unit 5, respectively matches the port name included in driver/port information of the special driver 32 stored in the storage 10 and the model name stored in the storage 10 in association with the driver/port information of the special driver 32.

At S23, the model name associated with the installed special driver is stored in the registry 13. This may allow the model name of the printer associated with the special driver to be identified when the special driver, which has been already installed, is to be updated. Subsequently, the controller 3 causes the display 7 to display an icon with a name generated at S22 (S24). In the examples as depicted in FIGS. 2 and 3, the display 7 displays an icon with a name "PRINTER A1 SPECIAL DRIVER".

An icon denoting the same name as before the update of the special driver 32 may be displayed in the display 7. The user may select the icon to execute printing, without feeling that the icon looks different. An icon name is an example of a label name as claimed.

If the controller 3 determines that all driver names are not extracted from the copied pieces of the driver/port information (S11: No), the controller 3 returns to S4 and repeats S4 through S10. In other words, the controller 3 repeats S4 through S10 until the controller 3 determines that all driver names are extracted from the copied pieces of the driver/port information. If the controller 3 determines that the driver/port information and the model name are not stored in the storage 10 (S12: No), the controller 3 notifies the user of no matching driver names (S14). For example, such a message "The device driver is not available for your printer", may be displayed in the display 7. The user, who has seen the message displayed in the display 7, may select a cancel button displayed in the special driver installation screen, as depicted in FIG. 5, and may end the installation of the special driver. The user may install the standard driver and then start installing the special driver again. If the controller 3 determines that no duplicate set is in the list (S15: No), the controller 3 causes the display 7 to display the list generated at S13 (S17).

If the controller 3 determines that no set is selected from the list displayed in the display 7 (S18: No), the controller 3 waits for user's selection of a set from the list. If the controller 3 determines that the driver name in the driver/port information obtained at S19 is not a special driver name (S20: No), the controller 3 proceeds to S22. When the driver name in the driver/port information obtained at S19 is not a special driver name, it means that the special driver 32 is not installed in the storage 10. In this case, the controller 3 does not execute S21 in which the special driver 32 is uninstalled from the storage 10.

[Technical Advantages]

(1) According to aspects of the disclosure, the special driver installer package 30 is downloaded from the server 20. Execution of the executable file 31 included in the special driver installer package 30 may cause the display 7 to display a list listing one or more sets of a model name and a port name of a printer controllable by the special driver 32.

A user is allowed to install the special driver 32 by selecting, from the list, a set of a model name and a port name of a printer that the user desires to use for printing with the special driver 32. The special driver 32 is commonly used for multiple models. The user does not have to find a correct or corresponding special driver for the his/her printer from multiple special drivers on a website. This may reduce a burden on a user's operation to install the special driver 32.

(2) Printers to which the special driver 32 is to be applied is identifiable based on the driver/port information stored in the storage 10. The special driver 32 may be installed for a printer that is powered off. This may be convenient for the user.

(3) Once the installer package 30 for the special driver 32 has been stored in the storage 10, the installer package 30 may be read out from the storage 10. This may eliminate the downloading and installation of the special driver installer package 30 for each of printers to which the special driver 32 is applied. This may reduce a burden on a user's operation for installing the special driver 32 for multiple printers.

(4) According to aspects of the disclosure, information on an icon name generated based on the installation of the special driver 32 includes a character string "SPECIAL DRIVER", which identifies the special driver 32, and a character string, e.g., "PRINTER A1", which identifies the model name stored in the storage 10 in association with the special driver.

The icon name may help the user to identify the printer to which the special driver is applied.

(5) According to aspects of the disclosure, the model name of the printer to be controlled by the special driver 32 is stored in the registry 13 of the storage 10. This may reduce the likelihood that the user rewrites the model name.

If a user rewrites an icon name, a model name may not be correctly identified from the character string of the icon name. The model name stored in the registry 13 may reduce such a situation that the model name is rewritten and thereby the installed special driver 32 is not correctly identified or is not uninstalled when the special driver 32 is to be updated.

(6) According to aspects of the disclosure, the display 7 displays a list including a model name of a printer that is identified by a driver name that is extracted from the driver/port information stored, prior to installing the special driver 32, in the storage 10 and that is matched with the driver name in the reference table 33. The list further includes a port name of the printer to be controlled by the driver having the matched driver name. The model name and the port name of the printer are associated with each other in the list.

This may allow the user to readily identify the printer to be controlled by the special driver 32, which is to be installed. If two or more same model printers to be controlled by the special driver 32 are present, the printers may be distinguished by their port names.

(7) According to aspects of the disclosure, the controller 3 determines (at S6) whether a driver name of a printer to which the standard driver 11 is applied matches with a driver name in the reference table 33. If the controller 3 has found multiple matching driver names based on the determination at S6, the controller 3 causes the display 7 to display a list listing one or more sets of information, each set including a model name and a port name that are associated with a respective one of the matching driver names.

This may allow the user to understand all the printer(s) that can execute printing with the special driver 32, allowing the user to select a printer.

(8) According to aspects of the disclosure, if the controller 3 finds a duplicate set (e.g., two same sets) of information including a model name and a port name, in a list to be displayed in the display 7, the controller 3 causes the display 7 to display the list listing one set. The display 7 may not redundantly display sets of information including the model name and the port name. This may allow a user to readily select one set.

(9) According to aspects of the disclosure, if a driver name, identified by a set of information (e.g., a model name and a port name) that is displayed in the display 7 and selected as a printer to be controlled by the special driver 32 by a user's operation of the operating unit 5, is a special driver name, the controller 3 uninstalls the special driver stored in the storage 10 and installs the updated version 36 of the special driver. Such user operation of the operating unit 5 (e.g., selection of the model name and the port name of the printer associated with the name of the driver that is to be updated) may cause the updated version 36 of the special driver to be installed in the information processing apparatus 1. This may reduce a burden on a user's operation for updating the special driver.

[Modifications]

(1) At S9, a model name of a printer corresponding to a matched standard driver name is obtained from the reference table. Alternatively, a driver name of a standard driver (standard driver name), which includes a model name of a printer, may be used for identifying the model name. A special driver installer package 30 may be configured to allow that multiple types of special drivers to be installed in the information processing apparatus 1, and a special driver update installer package 34 may be configured to update a special driver installed using the special driver installer package 30. An example will be described in conjunction with one installer package 30 that includes multiple special drivers, each for a different sheet type/size. In this example, the reference table 33 may store names of special drivers (e.g., SPECIAL DRIVER X and SPECIAL DRIVER Y), each for a different sheet type/size. The display 7 may display a screen (e.g., a list) for selecting a model name and a port name, as well as for selecting a sheet type/size. The controller 3 may obtain, from the reference table 33, a driver name corresponding to the sheet type selected by the user. For example, if the sheet type/size "X" is selected, "SPECIAL DRIVER X" corresponding to the sheet type/size "X" may be identified. Based on the identified "SPECIAL DRIVER X" and the model name, e.g., "PRINTER A1" selected from the list, an icon name "PRINTER A1 SPECIAL DRIVER X" may generated. The model name (e.g., PRINTER A1) may be stored in the registry 13.

(2) The installer package may be configured to cause the controller 3 to execute processing for updating firmware (firmware updating processing) after the controller 3 installs or updates the special driver. The information processing apparatus 1 may be configured to cause the controller 3 to execute the firmware updating processing after the controller 3 installs or updates the special driver.

(3) Aspects of the disclosure may be applied to an installer package and an information processing apparatus for controlling an image processing device, such as a scanner, other than a printer.

(4) The installer package according to aspects of the disclosure may be obtained through a website or through a storage medium, such as a USB memory device and a CD-ROM. Alternatively, the installer package according to aspects of the disclosure may be obtained from another information processing apparatus storing the installer package by communicating with the another information processing apparatus.

What is claimed is:

1. An installer package including an installer program for an information processing apparatus configured to communicate with an image processing device of a particular model, the information processing apparatus, comprising:
   a storage; and
   a controller,
   the storage storing a first driver, first driver information, and first port information;
      the first driver configured to control the image processing device of the particular model;
      the first driver information identifying the first driver and including model identification information that identifies the particular model of the image processing device;
      the first port information identifying a name of a port that the image processing device uses to communicate with the information processing apparatus; and
   the controller configured to execute the installer program of the installer package,
   the installer package comprising:
      a second driver for a particular function;
      an executable file including the installer program; and
      a reference table;

wherein the installer program, when executed by the controller, causes the information processing apparatus to perform:

obtaining the first driver information from the storage;

obtaining the first port information corresponding to the obtained first driver information from the storage;

determining whether the model identification information of the obtained first driver information is included in the reference table; and based on determining that the model identification information of the obtained first driver information is included in the reference table, installing the second driver in the storage, thereby storing the second driver, second driver information that identifies the second driver, the model identification information that identifies the particular model of the image processing device, and the first port information, in the storage in association with each other.

2. The installer package according to claim 1, wherein the storing further stores information on a label name to be displayed in a display of the information processing apparatus, and the information on the label name includes a character string that represents the installed second driver, and another character string that represents the particular model.

3. The installer package according to claim 1, wherein the storage stores the model identification information in a registry of the storage in association with the second driver, the second driver information, and the first port information.

4. The installer package according to claim 1, wherein the installer program, when executed by the controller, causes the information processing apparatus to further perform:

based on determining that the model identification information of the obtained first driver information is included in the reference table, displaying a first set of the model identification information of the obtained first driver information and the first port information corresponding to the model identification information in a display of the information processing apparatus.

5. The installer package according to according to claim 4, wherein the storage further stores a third driver, third driver information, and second port information;

the third driver configured to control another image processing device of another model;

the third driver information identifying the third driver and including model identification information that identifies the another model of the another image processing device;

the second port information identifying a name of a port that the another image processing device uses to communicate with the information processing apparatus;

wherein the installer program, when executed by the controller, causes the information processing apparatus to further perform:

obtaining the third driver information from the storage;

obtaining the second port information corresponding to the obtained third driver information from the storage;

determining whether the model identification information of the obtained third driver information is included in the reference table; and based on determining that the model identification information of the obtained third driver information is included in the reference table, displaying, in addition to the first set, another set of the model identification information of the obtained third driver information and the second port information in the display of the information processing apparatus.

6. The installer package according to claim 4, wherein the program, when executed by the controller, causes the information processing apparatus to further perform:

determining whether the second driver is installed in the storage; and based on determining that the second driver is installed in the storage, obtaining, from the storage, a set of the model identification information that identifies the particular model of the image processing device and the first port information that are stored in the storage in association with the second driver information;

determining whether the obtained set includes the same information as the first set;

based on determining that the obtained set includes the same information as the first set, displaying in the display, one of the obtained set and the first set as an available set.

7. The installer package according to claim 6, wherein the program, when executed by the controller, causes the information processing apparatus to further perform:

receiving an instruction for selecting the available set;

based on receiving the instruction, replacing the second driver installed in the storage with an updated version of the second driver.

8. An information processing apparatus configured to communicate with an image processing device of a particular model, comprising:

a storage; and a controller, the storage storing a first driver, first driver information, and first port information;

the first driver configured to control the image processing device of the particular model;

the first driver information identifying the first driver and including model identification information that identifies the particular model of the image processing device;

the first port information identifying a name of a port that the image processing device uses to communicate with the information processing apparatus; and the controller configured to execute an installer program of an installer package, the installer package comprising:

a second driver for a particular function;

an executable file including the installer program; and a reference table;

wherein the installer program, when executed by the controller, causes the information processing apparatus to perform:

obtaining the first driver information from the storage;

obtaining the first port information corresponding to the obtained first driver information from the storage;

determining whether the model identification information of the obtained first driver information is included in the reference table; and based on determining that the model identification information of the obtained first driver information is included in the reference table, installing the second driver in the storage, thereby storing the second driver, second driver information that identifies the second driver, the model identification information that identifies the particular model of the image processing device, and the first port information, in the storage in association with each other.

* * * * *